United States Patent [19]

Hamilton et al.

[11] Patent Number: 5,274,771

[45] Date of Patent: Dec. 28, 1993

[54] SYSTEM FOR CONFIGURING AN INPUT/OUTPUT BOARD IN A COMPUTER

[75] Inventors: Bradley W. Hamilton; John W. Slattery; Kerry J. Monroe, all of Fort Collins, Colo.

[73] Assignee: Hewlett-Packard Company, Palo Alto, Calif.

[21] Appl. No.: 932,980

[22] Filed: Aug. 20, 1992

Related U.S. Application Data

[63] Continuation of Ser. No. 693,358, Apr. 30, 1991, abandoned.

[51] Int. Cl.⁵ .................... G06F 13/00; G06F 7/04
[52] U.S. Cl. ..................... 395/275; 364/284.2; 364/238.3; 364/280.2; 364/DIG. 1; 371/11.1
[58] Field of Search ............... 395/275, 400, 325, 800, 395/425; 370/17, 93; 340/825.07, 825.52, 825.06; 364/488, 514; 371/11.1; 361/397, 400, 401, 412

[56] References Cited

U.S. PATENT DOCUMENTS

| Re. 33,705 | 10/1991 | Caprio et al. | 364/900 |
|---|---|---|---|
| 4,268,901 | 5/1981 | Subrizi et al. | 364/200 |
| 4,373,181 | 2/1983 | Chisholm et al. | 364/200 |
| 4,556,953 | 12/1985 | Caprio et al. | 364/900 |
| 4,589,063 | 5/1986 | Shah et al. | 364/200 |
| 4,660,141 | 4/1987 | Ceccon et al. | 364/200 |
| 4,670,855 | 6/1987 | Caprio et al. | 364/900 |
| 4,675,813 | 6/1987 | Locke | 364/200 |
| 4,750,136 | 6/1988 | Arpin et al. | 364/514 |
| 4,755,934 | 7/1988 | Inoue | 364/200 |
| 4,825,404 | 4/1989 | Theus | 364/900 |
| 4,849,931 | 7/1989 | Ishii et al. | 364/900 |
| 4,910,655 | 3/1990 | Ashkin et al. | 364/200 |
| 4,918,598 | 4/1990 | Ashkin et al. | 364/200 |
| 4,964,038 | 10/1990 | Louis et al. | 364/200 |
| 4,992,976 | 2/1991 | Yonekura et al. | 364/900 |
| 5,014,193 | 5/1991 | Garner et al. | 364/200 |
| 5,031,115 | 7/1991 | Hayashi | 364/519 |
| 5,034,878 | 7/1991 | Haapala et al. | 364/200 |
| 5,038,320 | 8/1991 | Heath et al. | 364/900 |
| 5,111,423 | 5/1992 | Kopec, Jr. et al. | 395/500 |

OTHER PUBLICATIONS

Rampage ® Plus 286 User's Manual; AST Research, Inc.,; Jun., 1988; p. ix.

*Primary Examiner*—Michael R. Fleming
*Assistant Examiner*—Gopal C. Ray

[57] ABSTRACT

An automatically configurable I/O board and associated software avoids any need for jumpers, switches, or other configuration changes upon installation of the board. Utilization of the main computer capability to select addresses and values likely to be available involves an installation or other routine which arrives at a unique parameter through common commands and repetitive execution. Uniqueness of the parameter or address is accomplished by checking for use elsewhere in the system prior to operation of the board. Steps are taken to avoid any inappropriate changes in conflicting I/O boards by activating components on the board through use of a state machine, by using non-destructive commands for initial checks, by tristating unnecessary lines, and by re-initializing registers whenever a conflict is encountered. Additionally no address space is used to activate the board.

22 Claims, 3 Drawing Sheets

SYSTEM FOR CONFIGURING AN INPUT/OUTPUT BOARD IN A COMPUTER

This is a continuation of application Ser. No. 07/693,358, filed Apr. 30, 1991 and now abandoned.

I. BACKGROUND OF THE INVENTION

Generally, this invention relates to the field of controlling input/output boards which are connected to an I/O bus. Specifically, the invention focuses on techniques to configure aspects, such as address space, of input/output boards without needing to physically connect or change jumpers on the card either at physical installation or after a system change.

Assembling computer systems to suit individual needs or desires by adding peripheral devices is often done. When such devices are connected, frequently they connect to the computer through an I/O card. These I/O boards are installed at initial computer manufacture as well as whenever a user adds new capabilities to the computer by plugging them into available slots on the input/output bus of the computer. Unfortunately, the process of adding capability involves more than just "plugging in" the I/O board and running the computer. The user or installer must configure the I/O board so that the computer can recognize it to communicate with it. This can be an involved process. When a standard I/O bus—the type of I/O bus traditionally installed in most computers—is involved, this process can be quite involved.

For a computer to be able to communicate with the I/O board, the computer must not only know what type of board it is, it must be able to selectively locate the I/O board and direct communications only to it. This is referred to as addressing the I/O board. As an example of the difficulties potentially encountered when assembling or changing such computer systems, the address must be assigned so that no other I/O boards have that same address. This problem of address allocation has been known for many years; several different solutions have been proposed, all with limitations overcome by the present invention. Several of these solutions, are discussed herein.

Perhaps the most common solution, and that referred to above is to provide physically changeable circuitry on the I/O board itself. The address or other characteristic is thus personalized by switches or jumpers which the installer must know how to set. The main drawback is that manual intervention is required at installation time which may lead to configuration errors. This can also require more detailed customer documentation and, as a practical matter, often leads the user to enlist professional help.

A second solution in the prior art is to replace the I/O bus. Recently, I/O busses have been developed which can specifically select one of the slots available through a slot select line or other technique. Naturally this has the undesirable consequence of increasing cost and possibly even making slot location an important installation criteria. As an example of such a solution, U.S. Pat. No. 4,755,934 to Inoue discloses a system which selects a board location by a slot select signal generated through the I/O bus and then assigns the board in that slot a specific address. While such a solution can overcome the need for installation decisions, it does not meet the criteria of the present invention of accommodating existing designs.

Another solution is that proposed in U.S. Pat. No. 4,964,038 to Louis. This proposes a system in which all I/O boards connected to the I/O bus utilize specific circuitry capable of generating a random address. If there are as many addresses generated as there are boards connected, it can then be assumed that each board has a unique address; if not, the random generation process is repeated. While this solution does specifically address the ability to be compatible with standard I/O busses, it has drawbacks overcome by the present invention. Among these are both the requirement that all boards to be of that type (again not allowing accommodation of existing systems) and the inherent difficulties of using randomly generated addresses in configurations which usually place some constraints on address possibilities.

One other solution is that proposed by U.S. Pat. No. 4,675,813 to Locke in which the I/O board includes circuitry which specifically recognizes a hardwire-set address and a configurable address register. While this solution can work with a standard I/O bus and with other, traditional I/O boards, it has other limitations. It does require the hardwire-set address to be unique. This can be unacceptable in the present environment in which a manufacturer simply cannot know how each system might be configured. In addition, it also is limited in that only one such I/O board can be placed in any system. Again the present invention overcomes such limits.

While each of the above limitations have been recognized, a solution to such problems, among others, has not been available prior to the present invention. Certainly the long felt need existed and as the present invention shows, the implementing arts and elements had been long available. Those skilled in the art appear to have been lead to believe that hardware and other such solutions were the only practical possibility by some of the prior efforts. In addition, the degree to which the common usage preconditions approaches from device, command, and connection perspectives has taught those skilled in the art in a direction away from that taken by the present inventors. Each appear to have taught away from the combination of commercial sensitivity and technical expertise necessary to achieve the present invention. All may have combined to cause the simple fact that those skilled in the art failed to see that the problem could be solved in a relatively simple manner.

II. SUMMARY OF THE INVENTION

The present invention discloses a method and apparatus which can accomplish automatic I/O board configuration even when connected to a standard I/O bus. The technique involves software routines executed by the computer which first acts to activate the I/O board, then to install the I/O board properly, and then automatically acts to confirm such installation as part of the operation of that I/O board. In use, the routine initially activates some aspects of a specific I/O board. This activation is accomplished in a manner which avoids any use of address space during activation and requires a minimum in terms of specific I/O board circuitry. Once partially activated, the technique selects an initial address or other parameter in a fashion which is likely to result in a unique address. The routine then assesses if this initial address is unique, if not, another address is selected. If the address is unique, the routine assigns the address to that I/O board. The technique can act to disable electrical connections so as to avoid any inappropriate responses. After installation, the technique can also act automatically to confirm proper installation each time the I/O board is operated. Thus it will even overcome address or other conflicts created unwittingly even after the particular board has been installed correctly.

An object of the invention is to provide a device which simplifies installation needs. Naturally it is an object to avoid any need for the installer to have any specialized knowledge or training in order to accomplish installation. Additionally, it is an object to minimize the need for involved installation documentation. It is thus an object to achieve assignment of address or other parameters automatically through operation of the computer. In assigning such parameters, it is an object to accomplish the task efficiently in a manner which prioritizes likely assignments and thus achieves the assignment as quickly as possible.

An important object of the present invention is to minimize any hardware required on the I/O board itself in order to achieve the objects herein stated. Accordingly, the present invention has the object of utilizing computer capabilities with minimal added board capabilities in order to accomplish its functions. An object is thus to avoid use of address space to configure the board during activation on the I/O board and to efficiently store the address, once assigned, on the board in existing components. Generally, an object is thus to use existing features of most I/O boards to the extent possible.

Another object of the present invention is to provide both the method and a device which integrates with existing designs of computers. Accordingly, it is an object to achieve the functions desired while allowing use of a standard I/O bus. In addition, it is an object to allow utilization of the invention with existing I/O boards if desired. In so doing, an object is to not only achieve proper configuration upon installation, but also to strategically check the installation at various times to confirm that no configuration changes, or additions of I/O devices, have occurred that might have created a conflict. Additionally, it is an object that if such a conflict is created, for the invention to automatically recognize such a conflict.

Yet another object of the invention is to provide a technique which avoids undesirable effects in the event of a change in system configuration. Not only does the invention minimize any use of potentially destructive actions in achieving its aims, but it also acts automatically to purge any undesirable effects when such become possible.

As mentioned, an object is to assess if the address or other parameter is unique to the I/O board before acting to assign it to that I/O board. In so doing, it is an object of the invention to use common commands—that is commands traditionally available and utilized by most I/O boards—in assessing such uniqueness. In addition, it is also an object of the invention to provide only so much operation as necessary to discover a conflict and thus not only achieve its aims efficiently, but avoid inappropriate results as much as possible.

Yet another object of the invention is to accommodate user input when necessary or desired. The invention not only allows the user to override the automatic parameter selection process, but it also allows the user to change the configuration of the I/O board itself if desired.

Finally, it is also an object of the invention to provide configurations which allow a variety of I/O boards to remain in use even though such boards utilize the same address. In so providing, the invention greatly expands the number of possibilities for numerous peripheral devices while still accommodating a standard I/O bus structure.

Naturally, further objects of the invention are disclosed throughout the specification and claims.

IV. DETAILED DESCRIPTION OF THE PREFERRED EMBODIMENTS

Figure 1:
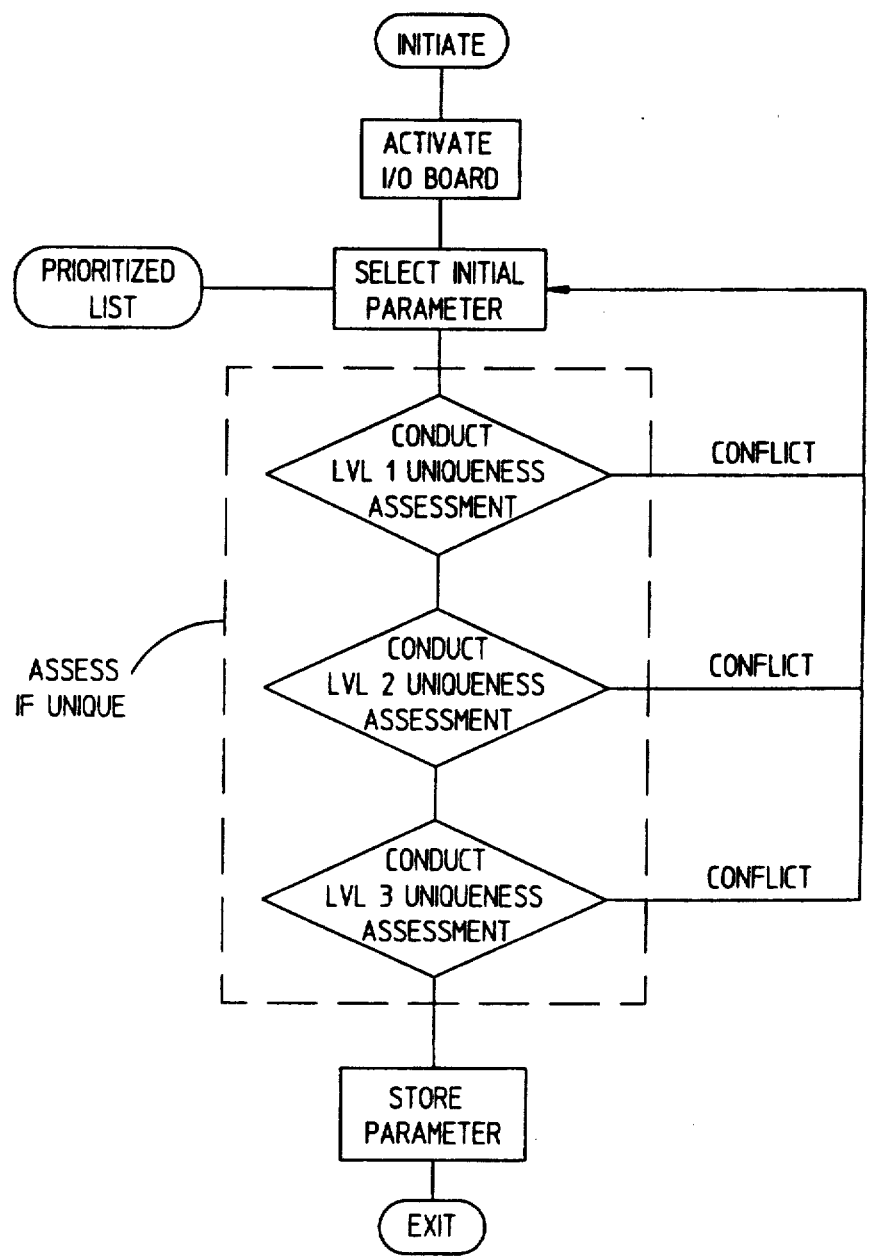
FIG. 1 is a flow chart diagram of the installation mode of the present invention with a variety of routines included.

As can be seen from the drawings, the present invention is relatively simple in nature and can be easily accomplished by those skilled in the art once its general nature is known. Basically, the technique uses an initial series of interactions between the computer (14) and the I/O board to arrive at the appropriate configuration parameters. These interactions can be, but need not be, accomplished in two modes: an installation mode and an operation mode.

The first mode is installation. This is when a peripheral is introduced to the computer system for the first time or when a user is reconfiguring the computer system. The second mode is normal operation of the I/O device, for example a tape drive. This can include either a repetition of the interactions accomplished in the installation mode, may include a more detailed interaction than the installation mode, or may be a more abbreviated interaction than that of the installation mode. Thus, once all possible details are understood, each may be combined as desired to achieve the goals of the invention. This would be evident to one skilled in the art and is disclosed to some extent in the claims, although they do not set out all the possible combinations.

Naturally, to need the invention, an I/O board, or some type of interactive circuitry—which may or may not be separately attached to the computer (14)—must be connected to the computer system. In most computer systems, this is usually done by connecting the I/O board into a board slot within the computer case. This board slot is actually a connection to the I/O bus (15) of the computer (14). It establishes a number of specific connections (1) between the computer (14) and the I/O board. The I/O bus (15) serves, together with its numerous electrical connections (20), as a means for communicating between the I/O board and the computer (14). If the I/O bus (15) is a standard bus, it will not have the inherent capability to select each slot individually. Thus, for the present invention, the I/O board may be randomly connected to any slot of the I/O bus (15); it is not dependent on location. Once physically installed, the methods of the present invention can then be initiated automatically or by the user by activating the installation mode of the invention when desired prior to running that I/O board. Thus the user need only plug the board in and put the cover back on the computer (14). The invention software will appoint the parameter and configure or reconfigure the I/O board. In contrast, many devices of the prior art required more action on the user's part. For example, to reconfigure an I/O board, it often was necessary to power down the computer, remove the cover on the system, adjust the switches and/or change jumpers which sometimes required removal of the board, plug the board back into the system, replace the cover, restore power to the system, and reboot the computer. Obviously, this was very time consuming and was prone to confusion and errors as users often found it difficult to match the hardware setups configured by the jumpers or the switches to the parameters set in the configuration file on the hard drive.

To understand the various routines of the invention, a review of the technique in the context of the installation mode is representative. Referring to FIG. 1, a flow chart of one possible installation sequence, it can be seen that the present invention greatly simplifies this process from the user's perspective by accomplishing the key steps through software routines. As FIG. 1 shows, the installation mode begins with the step of initiating the routine. This can be done automatically, or by user action. When done automatically, it is of course accomplished after the initiating operation of the computer (14) in the traditional manner. Once initiated, the invention acts automatically to selectively activate an I/O board and select an initial value for the I/O board (the order of these is not important).

The way in which the present invention individually activates an I/O board offers many advantages. First, it does not require a separate line from the I/O bus (15). Second, it can be accomplished with relatively inexpensive circuit additions to the I/O board. Essentially, the activation operation is individualized to a single board by using a specific sequence of common operations. The I/O board is configured to recognize this unique sequence, and then to activate some aspects of the board in response. As an additional protection against inappropriate responses, only so much of the I/O board need be initially activated as is necessary to assess the uniqueness of the assigned parameter.

As mentioned a specific sequence is used which the I/O board can recognize. This is recognized by use of circuitry commonly referred to as a state machine (10), as those skilled in the art might readily understand once they are exposed to this unique use, even though state machines are traditionally not used for such a routine. While any sequence could be used under the concepts of the invention, the preferred embodiment uses a read sequence referred to as the "first read sequence." The first read sequence activates the board to enter a setup mode. This unique activation technique also has the advantage of allowing multiple boards to share addresses, DMA channels and IRQ channels. It thus acts to greatly increase I/O board possibilities.

In order to allow individual activation, the sequence needs to be unique. It should act as a type of combination to unlock the board that other software or functions will have a very, very low probability of performing. In the preferred embodiment, a series of sixteen properly chosen I/O reads is used because it has been found that such a sequence rarely occurs in normal operation. Naturally, this number may vary based upon system configurations likely to be encountered. At present, it is believed that less than four I/O reads in the first read sequence would not present a sufficient number to properly serve as the combination lock desired. Naturally the number of reads can be increased as desired.

In addition to being a series composed of common commands, the use of a read sequence in general offers the additional advantage of being substantially non-destructive. This is discussed later in the context of the step of assessing if the chosen address is unique. Also, the use of state machine (10) allows individual activation to occur without utilizing any address space on I/O board (2). This can afford significant advantages not only in cost, but also in functionality. While the prior art teaches not only utilizing address space for activation, but also conducting the potentially destructive operation of writing to an address space, the present invention significantly departs from this approach.

Figure 2:
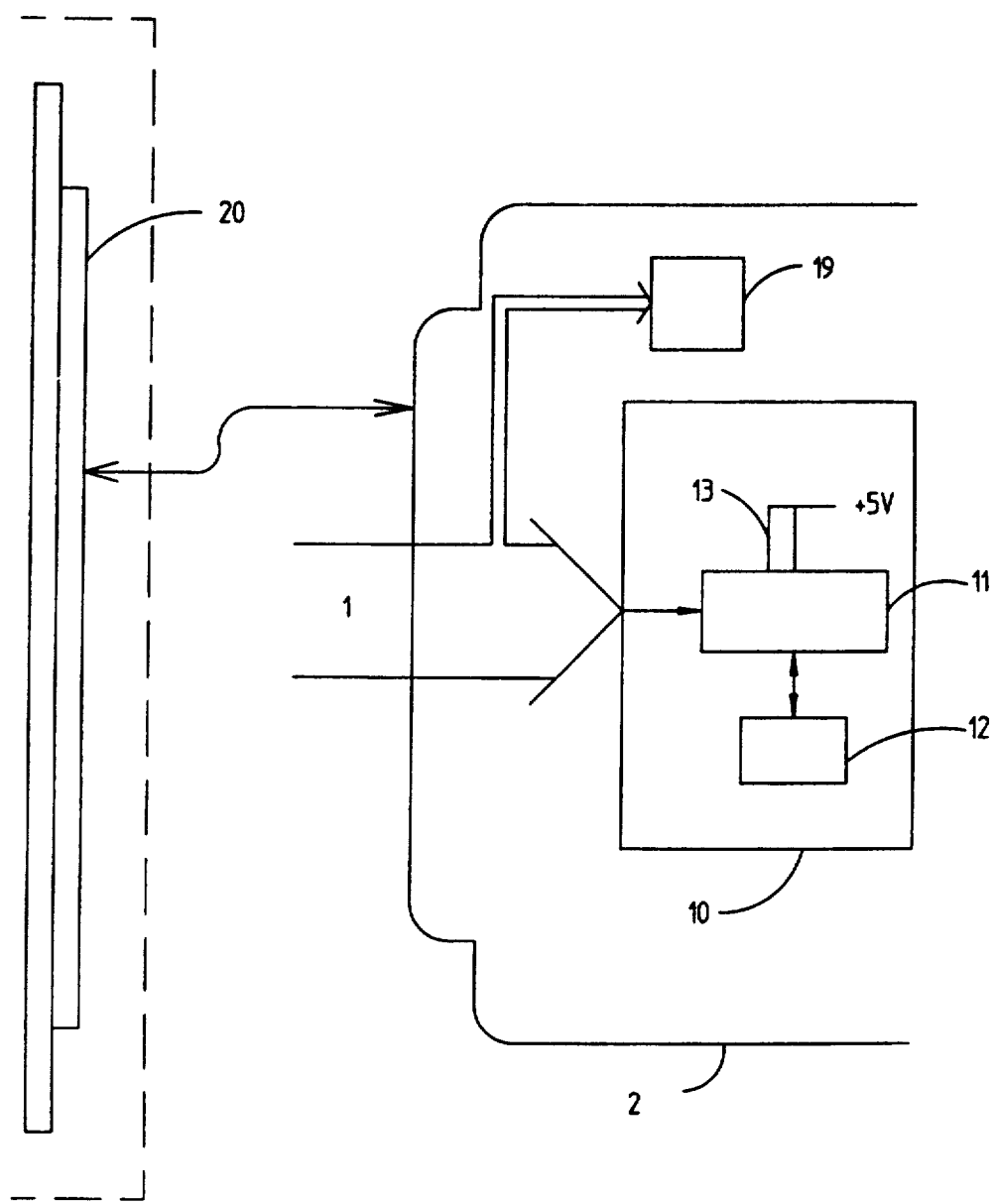
FIG. 2 is a schematic representation of the state machine portion of an I/O board according to the present invention.
Figure 3:
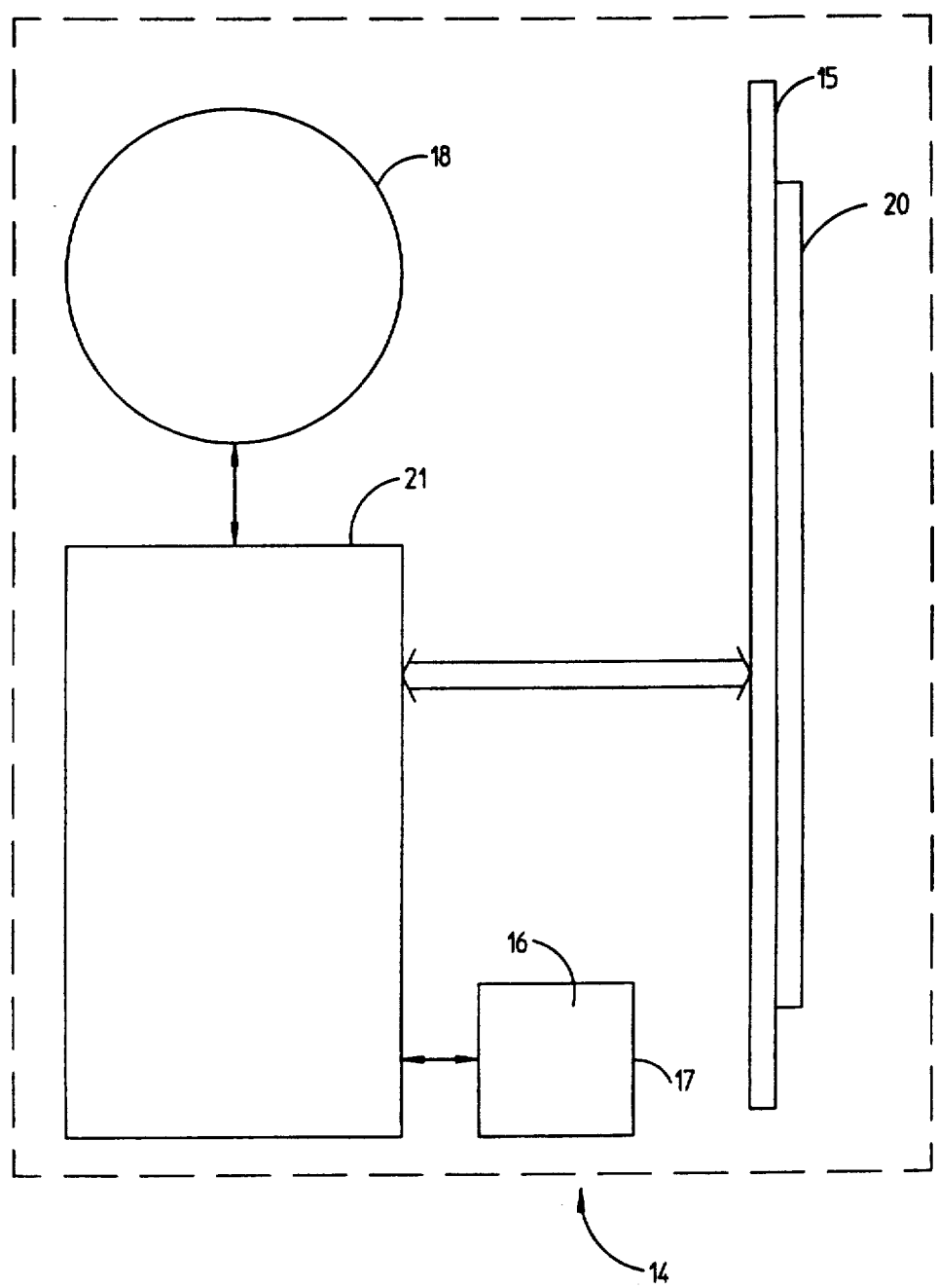
FIG. 3 is a schematic representation of one embodiment of the present invention showing internal elements of the computer.

As mentioned, state machine circuitry (10) as shown in FIG. 2 is configured to react to a sequence specific to that I/O board. Referring to FIG. 2, it can be seen that this circuitry is responsive to computer signals and actually includes one or more programmable array logic unit (PAL) (11) and counter (12). This is relatively inexpensive. Also, by placing such circuitry on the I/O board itself, the invention can meet its goal of being compatible with standard I/O busses. The actual sequence which state machine (10) recognizes may be set through interruptable wiring (13). State machine (10) has the inherent capability to automatically reset if the complete sequence is not received. This means that any read sequence not matched in the read sequence described above will reset state machine (10). If the sequence is followed, each successive read in the sequence will move state machine (10) on to the next state. If the state machine requires sequences to occur in a specific order, any sequence outside the order will reset the state machine.

In addition, state machine (10) is configured with a global sequence referred to as the "second read sequence." Thus each board may be configured to respond to two specific sequences: one to activate a specific board, and one to activate all boards in order to tristate them. For efficiency, the global sequence is a sequence which starts with the address read from base address with an offset of three. Thus, in operation, the second read sequence routine performs two reads from base address with base offset of three. For further efficiency, the global sequence and the unique activation sequence differ by only one value in the read sequence. The specific orders of the two are only one different. This simplifies circuitry required as one skilled in the art would readily recognize so that instead of having two separate state machines totally independent of each other, the board may have one state machine with just two different options at a particular state. In addition a board specific deactivation command can, of course, be provided if desired.

It should be understood that the process of activating an individual I/O board does not involve either a response from the board or the creation or change of any information on the board. First, avoiding any need for a response allows the state machine to monitor for the proper sequence without the I/O board being activated. Second, the aspect of avoiding any creation or change of information, that is, being substantially non-destructive, serves to avoid inappropriate responses within the system as discussed later in the context of the step of assessing if the chosen address is unique.

Either before activating aspects of one I/O board, or immediately afterward as shown in FIG. 1, the technique selects an initial parameter value. Again, as accomplished in the preferred embodiment, the base address parameter is selected. Rather then merely randomly trying a base address as shown by the prior art, the invention utilizes a prioritized list. This list is actually generated and stored on the computer (14) prior to these steps. Thus the memory means (17) of the computer (14) serves as part of the means for assigning the address (16) or other parameter which is on the computer (14), rather than added to the I/O board. The prioritized list is designed to start with the most likely address to be available initially. It is prioritized based on widely disseminated industry specifications which specify what addresses some peripheral devices use. Naturally this order may change from time to time as additional information becomes available. In addition, user override is possible. This would best be accomplished without accessing the board itself, so keyboard input is accommodated in the preferred embodiment.

At present, the list includes only seven possible base addresses This minimizes the hardware required on the I/O board. Naturally, additional base address possibilities can be included if desired. In order to accommodate operational needs (well understood to those in the art) in an efficient manner, each of these base addresses is chosen not only for its probability of being otherwise unused, but also so that most have at least sixteen contiguous bytes free.

In operation, the computer (14) acts to select the most likely base address to be available as an initial address. This initial address is then assessed to see if it is unique to that I/O board. If it is not unique, the next on the list is tried and so on.

Once an initial parameter value (such as a base address) is chosen, the technique automatically acts to assess if that value is unique to the I/O board. By doing this through operation of the computer (14), the computer (14) serves as a means for assessing uniqueness in contrast to the prior art. Again, by using the computer's programmable processing capability (21) cost is saved. Certainly the use of a priority list developed with the intent that the first value be unique is an advantage over the prior art which merely uses random generation of an initial value. In some instances this may be enough, however, in order to accommodate the broad variation in system configurations, this initial choice needs to be checked. As alluded to in the prior art this can be accomplished through a unique routine, however, the present invention accomplishes this through the use of common commands in several unique manners. First, it allows for a multileveled, escalating assessment routine. Second, it accomplishes initial assessment in a fashion which is substantially non-destructive and which provides additional information. Third, it uses a repetitive routine.

Referring to FIG. 1, it can be seen how the step of assessing if the initial address is unique is accomplished in a multilevel, escalating manner. As shown in FIG. 1, three levels of assessment are accomplished. While naturally, any number is possible, the important aspect is that at the end, it be well known that the selected address is in fact unique. The first level starts by using common commands which are substantially non-destructive to avoid destroying any information which could be contained on other I/O boards which might recognize the initial address by executing a write command or otherwise. As with the commands chosen to activate and deactivate the I/O board, this step may use another such sequence, referred to here as a "read sequence." In choosing such terms to identify the various read sequences involved, it should be understood that no order is implied. The terms "first read sequence," "second read sequence," and "read sequence," are chosen for differentiation purposes only as the techniques of the invention can be arranged in any order and still fall within the scope of the invention.

As mentioned, the commands are substantially non-destructive. This means that they are of such a character as to be very unlikely to change any information contained on the I/O board or within the computer (14). Certainly a write command acts to replace information contained at the write location. As such it is a destructive operation. While a read sequence can change information, this is far less likely, thus it is a substantially non-destructive operation. In the context of activating the board as discussed earlier, this is significant as if a command which is destructive is used, any unsuccessful attempts at assigning an address would destroy potentially important information.

Unlike the first read sequence, the read sequence does not rely on order to the same extent. Instead it is merely a true read sequence which ascertains the information contained in each address location. Again, for efficiency, an I/O board according to the present invention may be configured (but need not be so configured) so as to have an identification code in such address location. Thus the read sequence also discovers useful information in the event the address is found to be unique.

The conflict check through this sequence is accomplished by reading each address location used by the particular I/O board. It can do this sequentially. It is thus repetitive not in the sense that it does the same thing over and over, but rather in the sense that it does a different operation to see if the board correctly responds to each operation. In the case of the read sequence, not only must an identical identification code be returned at each location, the identification code must be consistent with a list of acceptable codes contained in a table. If the value read back is not in the software table on the computer (14), in other words, if the contents received back from the address locations are not what should be expected from any of the known boards that could possibly reside in the system, the routine assumes no board exists or that a possible conflict at that address exists.

If a conflict is indicated, the routine returns to select the next most likely address and tries it. Importantly, such a technique is effective because in the event two boards respond at once (i.e. both recognize the same address) an unintelligible signal is produced. This signal will thus be different from the identification code and will thus indicate that the initial address is not unique.

As an additional note, it should be understood that the board identification code not only tells the software which board is being installed, but it also tells it how may bytes to read since some boards use 8 bytes and others use 16 bytes, etc. The identification code can also indicate what hardware version is being installed. This allows updates or revision to the board to be recognized by the software where necessary or desired.

Earlier, it was mentioned that the routine used to assess if the chosen address is unique is an escalating routine. By this it is meant that the routine next executes commands which have an even higher probability of discovering a conflict.

The next level of assessment is to write to the board to tell it to return a value other than the identification value. In the preferred embodiment, a common command is sent to the I/O board which resets the same values to return all bits as zeros. This creates a command-response sequence. Also the state machine can be expanded to perform this function without any need for a write operation. Again, for efficiency, by using a single operation to reset all such values, less steps are involved. As with the read sequence conflict check, all values are compared by the computer (14) to assure that two boards do not respond at the same time. If a conflict exists, again, the routine returns to select another address and try it.

The prior process is repeated for the third level of conflict check with an operation which establishes all bits as one's at the same locations. If it indicates that no conflict was discovered, a unique address has been chosen. In addition, the computer (14) has identified that a board is residing at that location and what type of board is residing at that address location. All this has occurred without ever communicating with the board in the formal sense and even without ever fully activating the board.

In regard to the prior steps, it should be understood that any type of operation or command can be chosen, that any number of repetitions can be used, and that any level of checking can be instituted. While at present three levels have been found to be adequate, as the configurations of systems encountered changes, so, too, may the types or numbers of routines used change. In addition, the invention also offers an additional degree of protection against inappropriate responses. In the event that a conflict is discovered anywhere in the process, not only does the routine act to select another address, it also triggers the need to reboot the system after finally storing an appropriate address and other information. This reboot acts to reset the entire computer system (or at least so much as might reasonably be affected) and thus will act to avoid any inappropriately set values in the system. Naturally, if the address initially selected turns out to be unique, no such reboot will be necessary.

Once a unique address has been chosen, the setup, or installation mode can be exited. Again, this can be accomplished by executing a standard command, in this case a write at the base address with an offset of seven. Notice that the board has not yet been operated. Rather the unique parameter is saved for later use in the operation mode. The entire routine can then be repeated to change other addresses, other parameters, other boards, and the like.

As mentioned earlier, there is the possibility of manually changing the activation sequence. Referring to FIG. 2, it can be seen that state machine (10) is in part configured by interruptable wiring (13). By merely interrupting one or more of the traces comprising wiring (13), the user can physically change the sequence recognized. This, in turn, changes the activation combination recognized. Thus in the event a user desires to have two identical boards it can also be accomplished by the present invention. Two traces are shown in FIG. 2; by providing four traces sixteen combinations are possible. This would allow sixteen possible I/O read sequences in a computer system for the same type of board.

Once the software now knows which board the user wants to configure, it is likewise possible to select unique direct memory access (or DMA) channels and interrupt (or IRQ) channels. In addition, and incidentally highlighting how features may or may not be combined and still fall within the present invention, the preferred embodiment does not use the full three level conflict check to assign these parameters. Instead, such are merely chosen from a prioritized table without a full conflict check since it is far less likely that a conflict will exist at this stage. In addition manual selection is possible. Once again, the manual selection does the same thing for DMAs and IRQs as it did for base address. As for the DMA channel parameters it is conflict checked only in the event a particular I/O board type is involved. Recall that the type of I/O board was determined by the computer as part of the initial address conflict check. This information can then be used to trigger conflict checks only for particular board types, further highlighting the flexibility of the present invention. For the specific assignment of a compression DMA channel when a compression card is involved, the routine merely checks for a conflict by using the channel. A small block of data is sent to the I/O board, is passed through one of the chips on the board, put back on the hard drive, and compared to what was sent. If it is identical, uniqueness is assumed. Again, this is a specific routine which is presented only to highlight the flexibility offered by the present invention. Naturally other such specific testing can be accomplished and still fall within the scope and spirit of the present invention.

As mentioned earlier avoiding inappropriate responses during the attempts to arrive at a unique address is an advantage of the present invention. This is not only accomplished by using substantially non-destructive commands and rebooting the system when appropriate, but it is also accomplished by only activating certain aspects of the I/O board. Initially the present invention is configured to start out in a default condition having all important connections, the specific connections established by the board slot, in the electrically disconnected or tristated condition. The necessary lines must be untristated so that they can be used. This includes any combination of data lines (which are connected to the address space), DMA lines, IRQ lines, and the like. This is easily accomplished through use of a control register as those skilled in the art will readily recognize. Other techniques are, of course possible. While such registers are used to tristate some of the specific connections of the board, their use is not normally associated with an automatic configuration routine as disclosed here. By tying the control register to the state machine, it can only be utilized after a unique address has been assigned. This fact, and the fact that the configuration of the board has a default tristate condition, further affords the advantage of avoiding any inappropriate responses by preventing electrical activation of the lines "before their time." Thus the I/O board itself can contain the means for tristating such lines.

Once a unique parameter is found, it may be stored, preferably on existing, nonvolatile memory of the computer system, such as the hard disk (18). While a nonvolatile storage means can be added to the I/O board as in some prior art devices, the present invention uses existing nonvolatile memory on the computer for efficiency purposes. This also saves cost. The unique value can then be used in the second mode, the operational mode.

The operational mode of the present invention can be nearly identical to the installation mode, can include less than the installation mode, or can include more than the installation mode depending on circumstances or desires. While at first glance it may appear unnecessary to re-do each of the steps, this cannot be known with adequate certainty since changes in system configuration can be frequent and since the invention is designed to be compatible with other, traditional I/O boards. Thus prior to actually initiating operation of the I/O board, the step of confirming parameter uniqueness can be accomplished. Naturally this can and should use the information obtained during the installation mode for efficiency.

In the preferred embodiment, most of the steps are identical with only minor exceptions. Importantly, the initial address or other parameter selected to be tried should be the value originally arrived at through the installation mode. This is relatively straightforward.

As to the level one conflict check, namely accomplishing the read sequence, it is already known that a board exists and what type of board, so the routine will perform the read sequence for that one board.

In the operational mode, the unique parameter is also assigned to the board. While, as mentioned before, this is in volatile memory, the two part procedure used in the preferred embodiment overcomes—and even takes advantage of—this limitation. In addition, the invention expands upon how the prior art stored such information by using not only the board register, but by using the Application Specific Integrated Circuit (ASIC) (19) on the board. By so doing the invention achieves such storage while potentially reducing costs.

Finally, after all operation of the board for the present session is done, such lines may be tristated. If done at this point, it allows sharing of the same base address, DMA channels, and/or IRQ channels. This can be easily accomplished through the control register as mentioned earlier.

As will be readily understood by those skilled in the art, the foregoing methods may be accomplished with only minor changes to traditional I/O boards. With reference to the claims, it should be understood that the various steps can be accomplished by means which may already exist on the computer on traditional boards. This is in keeping with the goal of requiring the minimum amount of change to the hardware of the I/O board as possible.

The foregoing discussion and the claims which follow describe the preferred embodiments of the present invention. Particularly with respect to the claims, it should be understood that changes may be made without departing from the essence of the invention. In this regard such changes will naturally fall within the scope of the present invention. It is simply not practical to describe and claim all possible permutations and combinations of the new routines presented here or to describe and claim all possible revisions to the present invention which may be accomplished. To the extent such revisions utilize the essence of the present invention, each would naturally fall within the breadth of protection encompassed by this patent. This is particularly true for the present invention since its basic concepts and understandings are fundamental in nature and can be broadly applied not only to a variety of devices, but also in a variety of manners.

We claim:

1. A method of automatically configuring an input-/output board in a computer having a programmable processor and a memory means, the method comprising the steps of:

a. connecting an input/output board and a computer through an input/output bus;
    b. initiating operation of said computer through operation of said programmable processor;
    c. selecting an initial address for said I/O board through operation of said programmable processor;
    d. operating said programmable processor to assess if said initial address is unique to said I/O board by causing said I/O board to respond to commands such that if said initial address is not unique, more than one I/O board is likely to respond to said commands;
    e. assigning said address to said I/O board through operation of said programmable processor upon deciding that said address is unique to said I/O board; and
    f. storing said unique address in said memory means.

2. A method of automatically configuring an input-/output board on a computer as described in claim 1 wherein said step of assessing if said initial address is unique to said I/O board by causing said I/O board to respond to standard commands comprises the step of repetitively causing said I/O board to respond to commands.

3. A method of automatically configuring an input-/output board on a computer as described in claim 2 wherein said step of repetitively causing said I/O board to respond to commands comprises the step of issuing a read sequence from said computer.

4. A method of automatically configuring an input-/output board on a computer as described in claim 3 wherein said I/O board has a register and wherein step of repetitively causing said I/O board to respond to commands further comprises the steps of:

a. establishing a first value on said register after said step of issuing said read sequence; and then
    b. reading said register.

5. A method of automatically configuring an input-/output board on a computer as described in claim 4 wherein said step of repetitively causing said I/O board to respond to commands further comprises the steps of:

a. establishing a second value on said register after said step of reading said register; and then
    b. re-reading said register.

6. A method of automatically configuring an input-/output board on a computer as described in claim 3 wherein said I/O board utilizes a plurality of I/O addresses and wherein said step of issuing a read sequence from said computer comprises the step of reading all of said I/O addresses.

7. A method of automatically configuring an input-/output board on a computer as described in claim 4 or 5 wherein said step of establishing a value on said register comprises the step of executing a single operation.

8. A method of automatically configuring an input-/output board in a computer having a programmable processor and a memory means, the method comprising the steps of:

a. connecting an input/output board and a computer through plugging said input/output board into a standard I/O bus;
    b. initiating operation of said computer through operation of said programmable processor;
    c. assigning a unique address to said I/O board through operation of said programmable processor wherein said step of assigning an address to said I/O board comprises the steps of:

i. selecting an initial address for said I/O board through operation of said computer;
ii. operating said programmable processor to check if said initial address is in use elsewhere to assess if said address is unique to said I/O board;
iii. assigning said address to said I/O board upon deciding that said address is unique to said I/O board; and
d. storing said unique address in said memory means.

9. A method of automatically configuring an input/output board in a computer as described in claim 8 wherein said step of selecting an initial address comprises the step of choosing an address likely to be available from a predetermined list of potential addresses.

10. A method of automatically configuring an input/output board in a computer as described in claim 9 wherein said step of choosing an address likely to be available comprises the step of utilizing a priority list stored in the memory means of said computer of a number of addresses which is based upon the probability of each address being available.

11. A method of automatically configuring an input/output board on a computer as described in claim 10 and further comprising the steps of:
a. reselecting a second address in the event it is determined that said initial address is not unique to said I/O board; and then
b. reassessing if said temporary address is unique to said I/O board through operation of said computer.

12. A method of automatically configuring an input/output board on a computer as described in claim 11 wherein said step of reselecting a second address in the event it is determined that said initial address is not unique to said I/O board comprises the set of selecting the next most likely address from said priority list.

13. A method of automatically configuring an input/output board on a computer as described in claim 11 wherein said computer is capable of being entirely reset and further comprising the step of resetting said entire computer system after accomplishing said step of storing said unique address.

14. A method of automatically configuring an input/output board in a computer having a programmable processor and a memory means, the method comprising the steps of:
a. connecting an input/output board and a computer through an input/output bus;
b. initiating operation of said computer through operation of said programmable processor;
c. selecting an initial address for said I/O board through operation of said programmable processor;
d. operating said programmable processor to check if said initial address is in use elsewhere to assess if said initial address is unique to said I/O board;
e. assigning said address to said I/O board through operation of said programmable processor upon deciding that said address is unique to said I/O board; and
f. storing said unique address in said memory means; and
g. confirming that said address is unique through operation of said programmable processor.

15. A method of automatically configuring an input/output board on a computer as described in claim 14 wherein said step of confirming that said address is unique comprises the step of re-assessing if said address is unique.

16. A method of automatically configuring an input/output board on a computer as described in claim 15 wherein said I/O board has DMA channels and further comprising the step of establishing that said DMA channels are unique to said I/O board.

17. A method of automatically configuring an input/output board on a computer as described in claim 16 wherein said I/O board has interrupt channels and further comprising the step of establishing that said interrupt channels are unique to said I/O board.

18. An apparatus for configuring an input/output board having a plurality of components thereon in a computer having a programmable processor comprising:
a. a computer having a means for assigning an address;
b. an input/output board having components responsive to signals from said computer;
c. a means for communicating between said I/O board and said programmable processor of said computer; and
d. a means for assessing if said address is unique to said I/O board through operation of said computer to check if said initial address is in use elsewhere by issuing a command to said I/O board and wherein said means for assigning is responsive to said means for assessing.

19. An apparatus for configuring an input/output board in a computer as described in claim 18 wherein said computer has a programmable processor and wherein said means for assigning comprises said programmable processor.

20. An apparatus for configuring an input/output board in a computer as described in claim 19 wherein said computer has a memory means and wherein said means for assigning further comprises said memory means.

21. An apparatus for configuring an input/output board in a computer as described in claim 20 wherein said memory comprises a list of addresses.

22. An apparatus for configuring an input/output board in a computer as described in claim 21 wherein said list of addresses is stored in said memory in a prioritized manner.

* * * * *